(12) United States Patent
Usami

(10) Patent No.: US 7,466,339 B2
(45) Date of Patent: Dec. 16, 2008

(54) VEHICLE-MOUNTED CAMERA APPARATUS

(75) Inventor: Tomohide Usami, Okazaki (JP)

(73) Assignee: DENSO CORPORATION, Kariya (JP)

( * ) Notice: Subject to any disclaimer, the term of this patent is extended or adjusted under 35 U.S.C. 154(b) by 694 days.

(21) Appl. No.: 10/827,245

(22) Filed: Apr. 20, 2004

(65) Prior Publication Data

US 2004/0212686 A1 Oct. 28, 2004

(30) Foreign Application Priority Data

Apr. 24, 2003 (JP) ............................. 2003-120526

(51) Int. Cl.
  H04N 7/18 (2006.01)
  H04N 9/47 (2006.01)
  H04N 5/228 (2006.01)
  B60R 21/16 (2006.01)

(52) U.S. Cl. ...................... 348/148; 348/208.2; 280/735

(58) Field of Classification Search ................. 348/148, 348/208.99, 208.1, 208.2; 280/734, 735; 701/45, 46, 47
See application file for complete search history.

(56) References Cited

U.S. PATENT DOCUMENTS

| | | | | |
|---|---|---|---|---|
| 5,092,626 A | * | 3/1992 | Athanas et al. | 188/322.22 |
| 5,104,144 A | * | 4/1992 | Bethell | 188/284 |
| 5,409,078 A | * | 4/1995 | Ishioka et al. | 180/300 |
| 5,523,811 A | * | 6/1996 | Wada et al. | 348/118 |
| 5,850,254 A | | 12/1998 | Takano et al. | |
| 6,725,139 B2 | * | 4/2004 | Miller et al. | 348/148 |
| 2001/0008989 A1 | * | 7/2001 | Minowa et al. | 701/96 |
| 2004/0056963 A1 | * | 3/2004 | Ishikawa | 348/208.99 |

FOREIGN PATENT DOCUMENTS

| | | |
|---|---|---|
| JP | A-H02-085735 | 3/1990 |
| JP | A-H05-085134 | 6/1993 |
| JP | A-5-294184 | 11/1993 |
| JP | A-8-16999 | 1/1996 |
| JP | A-8-321984 | 12/1996 |
| JP | 11331681 A * | 11/1999 |
| JP | A-11-331681 | 11/1999 |

OTHER PUBLICATIONS

Notice of Reason for Rejection dated Jan. 8, 2008 in corresponding Japanese Patent Application No. 2003-120526 (and English translation).

* cited by examiner

*Primary Examiner*—Lin Ye
*Assistant Examiner*—Jason Whipkey
(74) *Attorney, Agent, or Firm*—Posz Law Group, PLC

(57) ABSTRACT

A stable display of an image on a screen with no motion blur which is obtained without providing a camera with a sensor for detecting vibration. A vehicle-mounted camera apparatus detects vibrations transferred to a vehicle from signals detected by a road surface sensor 4c that detects variation of force applied to a piston rod 6a of a shock absorber 6 constituting a suspension of the vehicle and corrects image motion blur based on the detected vibrations. This allows stable display of the image, with no motion blur, on the screen without providing the camera with a sensor for detecting vibration.

12 Claims, 4 Drawing Sheets

FORCE APPLIED TO PISTON ROD

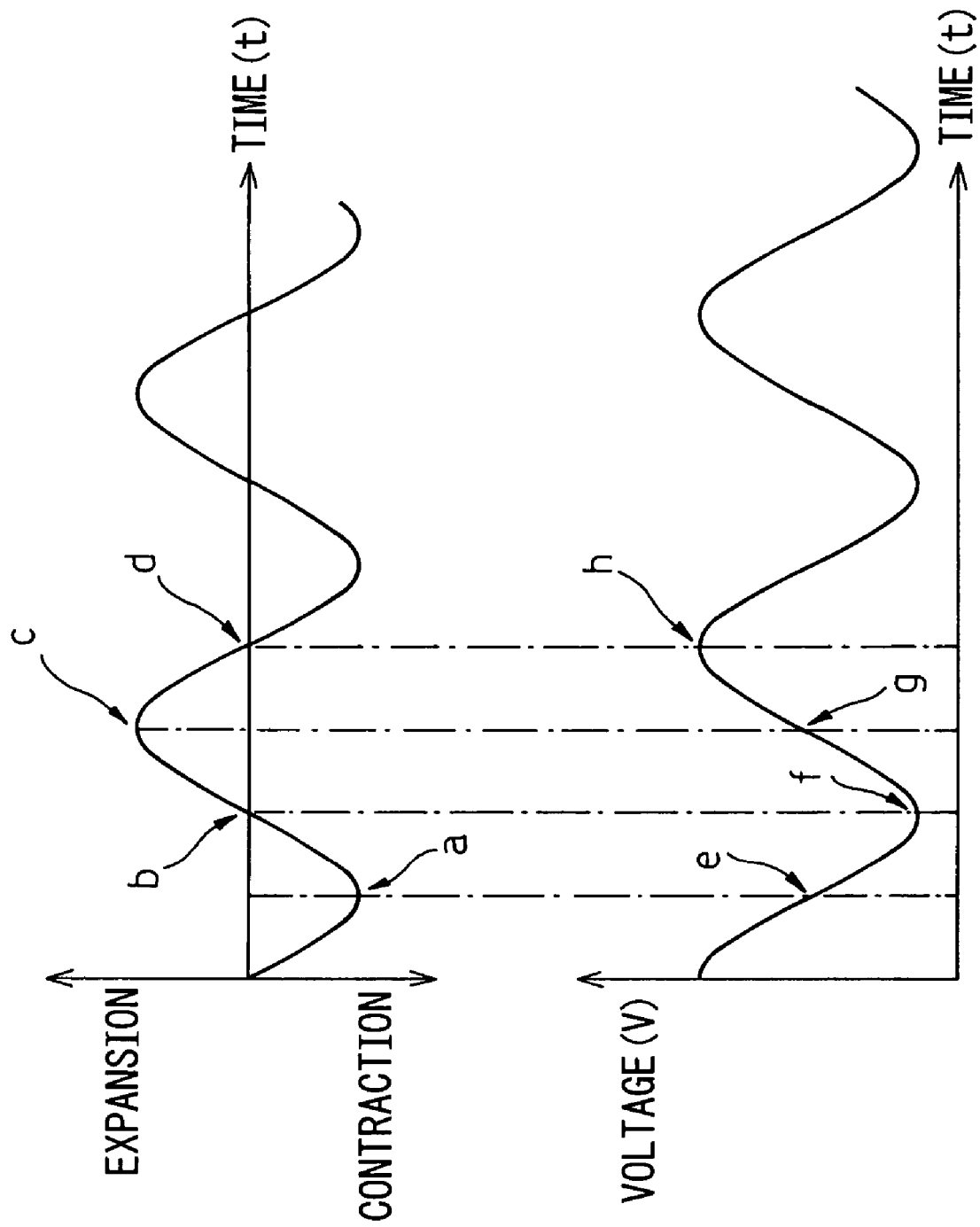

VEHICLE-MOUNTED CAMERA APPARATUS

TECHNICAL FIELD

The present invention relates to a vehicle-mounted camera apparatus.

BACKGROUND OF THE INVENTION

There have been proposed vehicle-mounted camera apparatuses intended to stably display images on screens without being affected by the vibration of vehicles (for example, JP-A-05-294,184).

In such vehicle-mounted camera apparatus, a video camera comprised of a lens for video camera and an imaging device such as a CCD is provided with a vibration detection sensor to detect vibration of the video camera. Further, in such vehicle-mounted camera apparatus, an optical path that passes through a variable vertical angle prism disposed in front of the lens is displaced according to the detected vibration so that an image with no motion blur can be provided to the imaging device.

However, in such vehicle-mounted camera apparatus, the video camera and the vibration detection sensor attached thereto are always used in combination. Therefore, when a plurality of video cameras are mounted on a vehicle, for example, there is a problem in that each video camera must be provided with a vibration detection sensor and the total cost of the vehicle-mounted camera apparatus is increased. Further, there is another problem in that general-purpose video cameras, that do not have a vibration detection sensor, cannot be used in such a vehicle-mounted camera apparatus.

SUMMARY OF THE INVENTION

It is an object of the present invention to provide a vehicle-mounted camera apparatus that can solve the problems described above.

It is another object of the present invention to provide a vehicle-mounted camera apparatus that can stably display an image, with no motion blur, on a screen without providing a video camera with a sensor for detecting vibrations.

A vehicle-mounted camera apparatus according to the present invention includes a camera mounted on a vehicle, a vibration detector provided on a body, a frame or a suspension of the vehicle and detects vibrations transferred to said vehicle, an image motion blur corrector for correcting a motion blur in an image captured by the camera based on the vibrations detected by the vibration detector, and a display controller for displaying the image corrected by the image motion blur corrector on a screen.

As described above, in the vehicle-mounted camera apparatus according to the present invention, a vibration detector for detecting the vibrations transferred to the camera is provided on the body, the frame or the suspension of the vehicle. Thus, when the camera is mounted on the vehicle fixedly, the vibration transferred to this camera are substantially similar to those transferred to the body, the frame or the suspension of the vehicle. Therefore, by providing the vibration detector in a position where the vibration transferred to the vehicle can be detected, such as the body, the frame, the suspension and the like, and, based on the vibrations that are detected by the vibration detector, correcting the motion blur in the image displayed on the screen, an image with no motion blur can be stably displayed on the screen without providing the camera with the vibration detector. Further, a general-purpose video camera that is not combined with a vibration detector can also be used.

Here, the vibration transferred to the vehicle are divided broadly into two categories: external vibrations that are transferred by unevenness of road surfaces via wheels, and internal vibrations that are generated by rotation of rotating parts such as, for example, a propeller shaft. When the vibration detection means is provided on the suspension of the vehicle, the external vibrations described above are detected. On the other hand, when the vibration detection means is provided on the body or the frame of the vehicle, both the external and internal vibrations described above can be detected. By detecting both the external and internal vibrations, the image can be more stably displayed on the screen.

Further, in the vehicle-mounted camera apparatus according to the present invention, it is preferred that the vibration detector is provided on the suspension of the vehicle and detects variation of force applied to a piston rod of a shock absorber constituting said suspension as the vibration transferred to the vehicle.

The external vibrations described above are applied to the piston rod of the shock absorber. Therefore, by detecting the variation of the force applied to the piston rod, the vibrations transferred to the camera can be detected.

Further, in the vehicle-mounted camera apparatus according to the present invention, it is preferred that the vibration detector is provided on the suspension of the vehicle in the vicinity of the position where the camera is mounted.

For example, in the case of vehicles with a relatively large height such as RV (Recreational vehicles) and SUV (Sports Utility Vehicles), there is a blind spot for the driver in the immediate vicinity of the front part of the vehicle and near the front wheel on the passenger's side and, therefore, the driver cannot recognize infants, obstacles and the like present in the blind spot. Therefore, the blind spot area of the driver is captured by the vehicle-mounted camera and the captured image is displayed on the screen so that the driver can recognize obstacles and the like present in the blind spot.

When the vehicle-mounted camera is used for covering the blind spot of the driver, the camera is mounted, for example, in the front part of the vehicle, in the vicinity of a door mirror on the passenger's side and the like outside the vehicle. Therefore, the vibrations transferred to the camera can be detected more accurately from the vibration detector provided on the suspension in the vicinity of the position where the camera is mounted.

Further, in the vehicle-mounted camera apparatus according to the present invention, the vibration detector is preferably a sensor that is used for controlling a damping force of a shock absorber in the suspension in the vehicle. For example, a suspension controller for controlling the damping force of the shock absorber according to the magnitude of the vibrations comprises a sensor for detecting the vibrations transferred to the vehicle. Therefore, by using the detection signal of this sensor used for controlling the damping force of the shock absorber, the need to provide the camera with the sensor for detecting the vibrations of the camera itself is eliminated. As a result, the cost of the vehicle-mounted camera apparatus can be reduced.

Still further, in the vehicle-mounted camera apparatus according to the present invention, it is preferred that the image motion blur corrector determines the amount and direction of the motion blur in the image displayed on the screen that corresponds to the image captured by said camera based on the vibrations detected by the vibration detector and, then, changes the area to be displayed on the screen within the image captured by the camera according to the amount and direction of the image motion blur.

This allows the image to be stably displayed on the screen. Here, the image motion blur may not be limited to changing the area to be displayed on the screen and, alternatively, for example, it may be corrected by moving an optical lens or a light receiving element of the vehicle-mounted camera.

BRIEF DESCRIPTION OF THE DRAWINGS

The invention will be more clearly understood after reference to the following detailed description of preferred embodiments read in conjunction with the drawings, wherein:

FIG. 5A is a conceptual diagram showing temporal transition between expansion and contraction of the shock absorber 6 and FIG. 5B is a conceptual diagram showing voltage output from the sensor 4c accordingly.

DETAILED DESCRIPTION OF PREFERRED EMBODIMENTS

Hereinafter, a vehicle-mounted camera apparatus, in embodiments of the present invention, will be described with reference to the drawings. The vehicle-mounted camera apparatus of the embodiments is comprised of a vehicle-mounted camera image display device 1 shown in FIG. 1 and a suspension controller 2 shown in FIG. 2.

Figure 2:
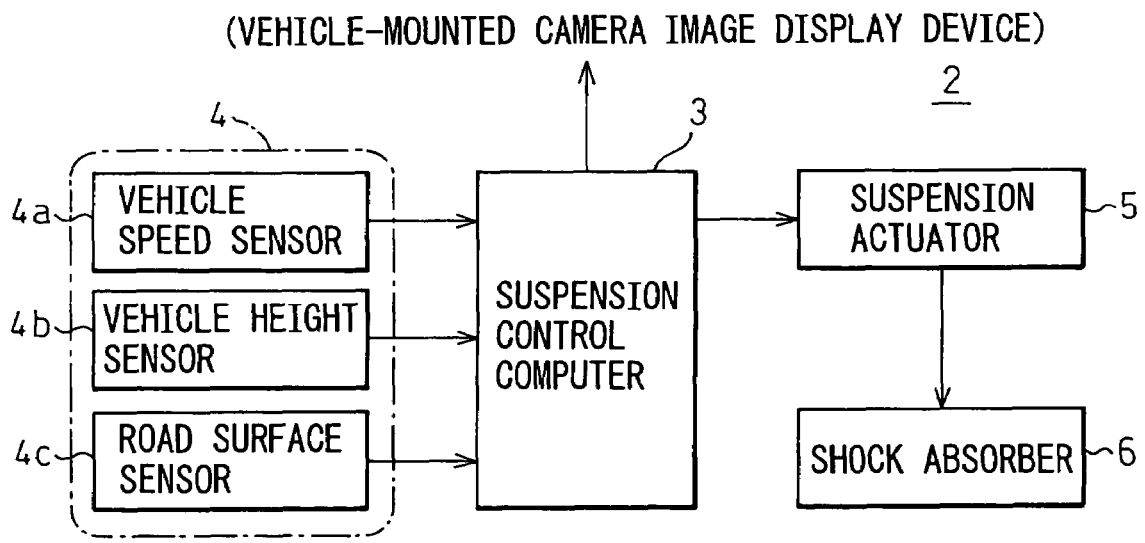
FIG. 2 is a block diagram showing a schematic configuration of a suspension controller 2 according to the embodiments of the present invention.

FIG. 2 is a block diagram showing a schematic configuration of the suspension controller 2. As shown in FIG. 2, the suspension controller 2 is comprised of a suspension control computer 3, a sensor group 4, a suspension actuator 5 and so on.

The sensor group 4 is comprised of a vehicle speed sensor 4a, a vehicle height sensor 4b and a road surface sensor 4c. The vehicle speed sensor 4a detects the speed of a vehicle and the vehicle height sensor 4b detects the height of the vehicle from the expansion or the contraction of a suspension.

Figure 3:
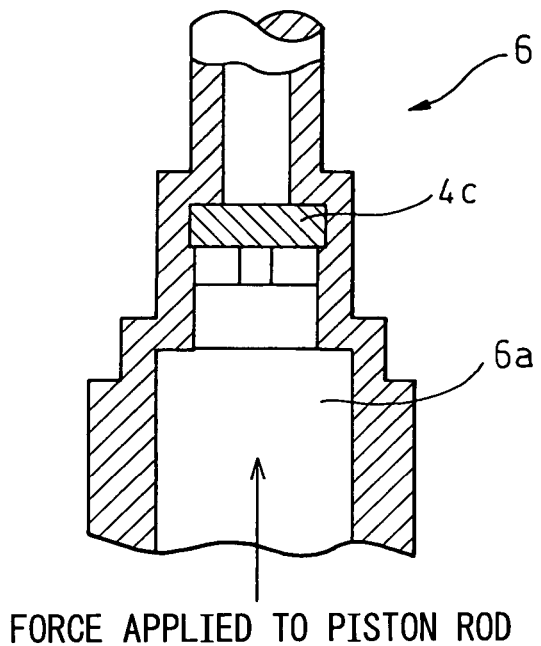
FIG. 3 is a diagram showing a road surface sensor 4c attached to the upper part of a shock absorber 6 according to the embodiments of the present invention.

A piezoelectric element such as a piezo element is used as the road surface sensor 4c, for example. The road surface sensor 4c is attached to the upper part of a shock absorber 6 as shown in FIG. 3 and detects a variation in the force applied to a piston rod 6a via a wheel due to an unevenness of the road surface and the like. This force, applied to the piston rod 6a, is converted to voltage by the piezoelectric element and this voltage signal is output to the suspension control computer 3.

For example, when the shock absorber 6 repeatedly expands and contracts as shown in FIG. 5A, the road surface sensor 4c outputs voltage as shown in FIG. 5B. As shown in FIGS. 5A and 5B, at the point (b) where the shock absorber 6 makes transition from "contraction" to "expansion" and the force changes significantly, the minimum voltage value (f) is output. On the other hand, at the point (d) where the shock absorber 6 makes transition from the "expansion" to the "contraction" and the force changes significantly, the maximum voltage value (d) is output. As shown in FIGS. 5A and 5B, when the shock absorber 6 contracts at most (a) and expands at most (c), as the force does not change, an intermediate voltage value (e) and (g) between the maximum voltage value (h) and the minimum voltage value (f) is output.

As described above, the force applied to the piston rod 6a changes according to the expansion or contraction of the shock absorber 6 and the voltage corresponding to the magnitude of the change of the force is output from the road surface sensor 4c.

The suspension control computer 3 controls the suspension actuator 5 based on various signals from the sensor group 4 so as to control the damping force of the shock absorber 6. Further, the suspension control computer 3 sends data representing the output voltage value of the road surface sensor 4c to the vehicle-mounted camera image display device 1.

Figure 1:
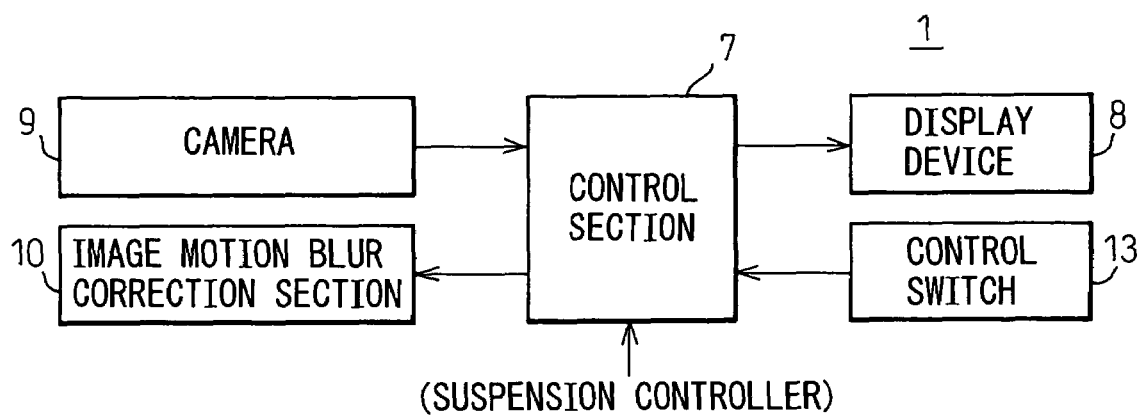
FIG. 1 is a block diagram showing an internal structure of a vehicle-mounted camera apparatus 1 according to embodiments of the present invention.

Next, an internal structure of the vehicle-mounted camera image display device 1 will be described with reference to FIG. 1. As shown in FIG. 1, the vehicle-mounted camera image display device 1 is comprised of a display device 8, a camera 9, an image motion blur correction section 10, a control switch 13 and a control section 7 and the like.

The control unit 7 is configured as a typical computer. The control unit 7 comprises therein a CPU, a ROM, a RAM, an I/O, a bus line connecting them with each other and so on, which are well-known. Here, the image motion blur correction section 10 may constitute a part of the control section 7. The control switch 13 is comprised of power switches for the display device 8 and the camera 9 and the like.

The display device 8 is a color display device disposed in the vicinity of a center panel in a cabin. The display device 8 may be, for example, a CRT, a liquid crystal display, a plasma display and the like.

The camera 9 is mounted, for example, in the front part of the vehicle, in the vicinity of a door mirror on the passenger's side, and the like, outside the vehicle. This camera 9 is used for covering the blind spot of the driver of the vehicle. More specifically, in the case of a vehicle with a relatively large height such as an RV and an SUV, there is a blind spot for the driver in the immediate vicinity of the front part of the vehicle and near the front wheel on the passenger's side and, therefore, the driver cannot recognize infants, obstacles and the like present in the blind spot. Therefore, such vehicles are typically provided with a mirror to see the blind spot area in addition to the door mirror but, in this embodiment, the blind spot area is captured by the camera and the captured image is displayed on the screen.

When the camera 9 is mounted in the front part of the vehicle, in the vicinity of the door mirror and the like as described above, the vibrations transferred to the camera 9 can be detected more accurately from the road surface sensor 4c provided in the suspension in the vicinity of the position where the camera 9 is mounted.

The image motion blur correction section 10 determines the amount and direction of a motion blur in an image displayed on the screen of the display device 8 based on the output voltage value of the road surface sensor 4c transmitted from the suspension controller 2 and, according to the amount and direction of the motion blur, changes the range, to be displayed on the screen, of the image captured by the camera.

If the vehicle vibrates due to unevenness of the road surfaces and the like and the image captured by the camera 9 is displayed on the screen of the display device 8 with a motion blur in the vertical direction due to the vibrations and, for example, in the case of the voltage values (e) and (g) shown in FIG. 5B, the force applied to the piston rod 6a does not change and the amount of the image motion blur is reduced to a minimum at this time. On the other hand, for the voltage values (f) and (h) shown in FIG. 5B, the force applied to the piston rod 6a changes significantly and the amount of the image motion blur is increased to a maximum at this time. Therefore, for example, a relationship between the output voltage value of the road surface sensor 4c and the amount of the image motion blur is determined in advance by experiment or other means and, then, the amount of the image motion blur is determined by substituting the output voltage value into this relationship.

Further, if the output voltage value of the road surface sensor 4c shown in FIG. 5B is compared with the previous value, the condition of the shock absorber 6, such as whether it expands or contracts, can be determined according to the variation of the output voltage value.

Figure 6A:
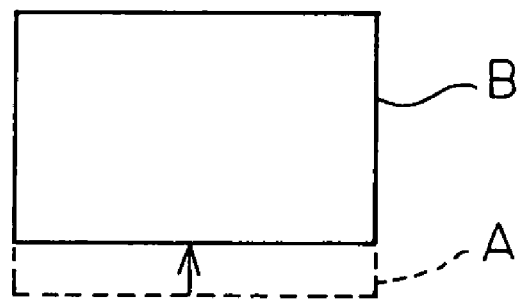
FIG. 6A is a conceptual diagram showing an alteration of a area B to be displayed on a screen of a display device 8 within an image area A captured by a camera 9 according to the direction of an image motion blur and FIG. 6B is a conceptual diagram showing another alteration of the area B to be displayed on the screen of the display device 8 within the image area A captured by the camera 9 according to the direction of the image motion blur.
Figure 6B:
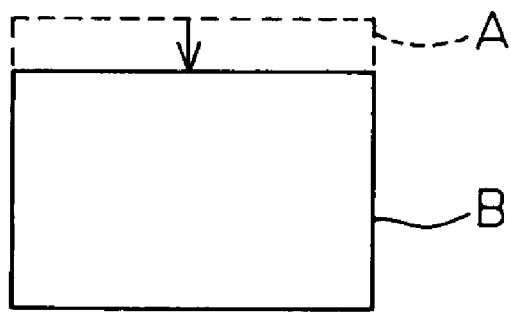

Then, as shown in FIGS. 6A and 6B, for example, the image motion blur correction section 10 changes the area B to be displayed on the screen of the display device 8 within the image area A capture by the camera 9 according to the amount and direction of the motion blur. This allows stable display of the image on the screen. Here, the method for correcting the amount and direction of the image motion blur may not be limited to changing the area of the image to be displayed on the screen of the display device 8 and, alternatively, for example, the amount and direction of the image motion blur may be corrected by moving an optical lens or a light receiving element of the camera.

Figure 4:
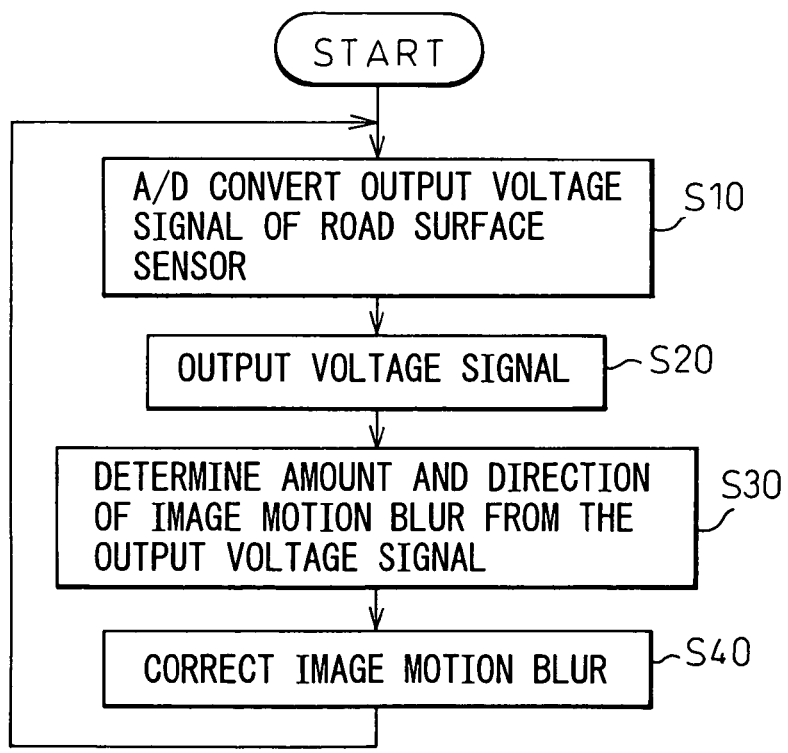
FIG. 4 is a flow chart showing a process for correcting an image motion blur in the vehicle-mounted camera apparatus 1 according to the embodiments of the present invention.

Next, the process for correcting the image motion blur in the vehicle-mounted camera image display device 1 will be described with reference to a flow chart shown in FIG. 4. In step S10, the output voltage signal of the road surface sensor 4c is A/D converted. In step S20, the output voltage signal of the road surface sensor 4c is output from the suspension controller 2 to the vehicle-mounted camera image display device 1.

In step S30, the output voltage signal transmitted from the suspension controller 2 is input to the vehicle-mounted camera image display device 1 and, based on the output voltage signal, the amount and direction of the image motion blur is determined. In step S40, the area B to be displayed on the screen of the display device 8 within the image area A captured by the camera 9 is changed according to the determined amount and direction of the image motion blur.

As described above, the vehicle-mounted camera apparatus in this embodiment, which is comprised of the vehicle-mounted camera image display device 1 and the suspension controller 2, detects the variation of the force applied to the piston rod 6a of the shock absorber 6 constituting the suspension and determines the amount and direction of the motion blur in the image displayed on the screen of the display device 8 based on the output voltage value from the road surface sensor 4c that corresponds to the detected variation. Then, it corrects the image motion blur based on its amount and direction. This allows stable display of the image with no motion blur on the screen without providing the camera 9 itself with the means for detecting the vibrations. Further, general-purpose cameras that are not combined with sensors and the like, to detect vibration, can be applied to this embodiment.

(Variation 1)

When only the distance from the camera to the object to be captured varies due to the vibration of the vehicle, an out-of-focus image may be displayed on the screen of the display device 8. In this case, the vehicle-mounted camera apparatus may be configured to detect the vibrations of the vehicle by the road surface sensor 4c of this embodiment and to change the focus of the camera, by an optical means or a digital means provided in the camera, according to the output voltage signal from the road surface sensor 4c.

(Variation 2)

In this embodiment wherein the image motion blur in the height direction due to the vibrations transferred to the body of the vehicle is corrected, the shock absorbers 6 of all wheels of the vehicle may be provided with the road surface sensors 4c. This allows detection of behavioral variation of the vehicle such as roll and pitch conditions and, according to the detected signal, the amount of the behavioral variation of the vehicle can be determined with respect to the horizontal position of the vehicle. As a result, the image can be displayed more stably by correcting the image motion blur so that the behavioral variation is canceled.

(Variation 3)

Though the road surface sensor 4c provided in the shock absorber 6 detects the road surface condition in this embodiment, the sensor may be mounted, for example, on the body or frame of the vehicle to detect the vibrations transferred to the vehicle. For example, passenger safety devices such as impact-absorbing air bags use sensors for detecting acceleration occurring in the longitudinal, transverse and vertical directions of the vehicle. Therefore, detection signals of these sensors that detect acceleration occurring in the longitudinal, transverse and vertical directions of the vehicle can be used to detect the vibrations in the longitudinal, transverse and vertical directions of the vehicle. This allows correction of the image motion blur in the longitudinal, transverse and vertical directions of the vehicle.

Here, though vibration transferred to the body of the vehicle is divided broadly into two categories: external vibrations that are transferred by unevenness of the road surfaces via the wheels of the vehicle, and internal vibrations that are generated by rotation of rotary parts such as, for example, a propeller shaft, this embodiment solely corrects the image motion blur resulted from the external vibrations. However, as described above, both the external and internal vibrations described above can be detected by the sensors mounted on the body or frame of the vehicle to detect the total vibrations transferred to the vehicle. This allows a more stably display of the image on the screen.

I claim:

1. A vehicle-mounted camera apparatus, comprising:
    a camera mounted on a vehicle;
    a vibration detector provided on a suspension of said vehicle that detects variation of force applied to a piston rod of a shock absorber contained within said suspension of said vehicle as vibration transferred to said vehicle;
    a sensor provided on an impact-absorbing air bag for detecting acceleration in a transverse direction of said vehicle;
    an image motion blur corrector for correcting a motion blur, in an image captured by said camera, in a vertical direction, based on vibrations detected by said vibration detector and correcting a motion blur, in said image capture by said camera, in the transverse direction, based on acceleration detected by said sensor; and a display controller for displaying an image corrected by said image motion blur corrector.

2. The vehicle-mounted camera apparatus according to claim 1, wherein said vibration detector is a sensor for controlling damping force of a shock absorber of a suspension of said vehicle.

3. The vehicle-mounted camera apparatus according to claim 2, wherein said image motion blur corrector determines an amount and direction of a motion blur in an image displayed on a screen that corresponds to the image captured by said camera based on vibrations detected by said vibration detector, and changes an area to be displayed on said screen, within an image captured by said camera, according to said amount and direction of a image motion blur.

4. The vehicle-mounted camera apparatus according to claim 1, wherein said image motion blur corrector determines an amount and direction of a motion blur in an image displayed on a screen that corresponds to the image captured by said camera based on vibrations detected by said vibration detector, and changes an area to be displayed on said screen, within an image captured by said camera, according to said amount and direction of a image motion blur.

5. The vehicle-mounted camera apparatus according to claim 1, wherein said vibration detector outputs a voltage to the image motion blur corrector that is relative to an amount of expansion or contraction of said suspension of said vehicle.

6. The vehicle-mounted camera apparatus according to claim 1, wherein said vibration detector detects the variation in force applied to the piston rod due to an unevenness of the road surface and outputs a voltage based thereon to the image motion blur corrector.

7. A vehicle-mounted camera apparatus comprising:

a camera mounted on a vehicle;

a vibration detector provided on a suspension of said vehicle in the vicinity of the position where said camera is mounted;

a sensor provided on an impact-absorbing air bag for detecting acceleration in a transverse direction of said vehicle;

an image motion blur corrector for correcting a motion blur, in an image captured by said camera, in a vertical direction, based on vibrations detected by said vibration detector and correcting a motion blur, in said image captured by said camera, in the transverse direction, based on acceleration detected by said sensor; and a display controller for displaying an image corrected by said image motion blur corrector.

8. The vehicle-mounted camera apparatus according to claim 7, wherein said vibration detector is a sensor for controlling damping force of a shock absorber of a suspension of said vehicle.

9. The vehicle-mounted camera apparatus according to claim 7, wherein said image motion blur corrector determines an amount and direction of a motion blur in an image displayed on a screen that corresponds to the image captured by said camera based on vibrations detected by said vibration detector, and changes an area to be displayed on said screen, within an image captured by said camera, according to said amount and direction of a image motion blur.

10. The vehicle-mounted camera apparatus according to claim 7, wherein said vibration detector outputs a voltage to the image motion blur corrector that is relative to an amount of expansion or contraction of said suspension of said vehicle.

11. The vehicle-mounted camera apparatus according to claim 7, wherein said vibration detector is connected to a piston rod contained within said suspension system of said vehicle, detects a variation in force applied to the piston rod due to an unevenness of the road surface and outputs a voltage based thereon to the image motion blur corrector.

12. A vehicle-mounted camera apparatus, comprising:

a camera mounted on a vehicle;

a road surface sensor mounted on a suspension of said vehicle;

a suspension controller receiving an output from said road surface sensor and outputting a signal controlling an actuator of said suspension of said vehicle;

a sensor provided on an impact-absorbing air bag for detecting acceleration in a transverse direction of said vehicle;

an image motion blur corrector for correcting a motion blur in an image captured by said camera, in a vertical direction, based on a voltage output from the suspension controller and correcting a motion blur, in said image captured by said camera, in the transverse direction, based on acceleration detected by said sensor; and a display controller displaying an image corrected by said image motion blur corrector.

* * * * *